(12) United States Patent
Li et al.

(10) Patent No.: US 10,459,983 B2
(45) Date of Patent: Oct. 29, 2019

(54) METHOD AND DEVICE OF HIERARCHICAL DOCUMENT FILTERING

(71) Applicant: Guangzhou Shenma Mobile Information Technology Co., Ltd., Guangzhou, Guangdong Province (CN)

(72) Inventors: Yang Li, Guangzhou (CN); Mingcheng Wan, Guangzhou (CN); Honglei Zeng, Guangzhou (CN)

(73) Assignee: Guangzhou Shenma Mobile Information Technology Co., Ltd., Guangzhou (CN)

( * ) Notice: Subject to any disclaimer, the term of this patent is extended or adjusted under 35 U.S.C. 154(b) by 436 days.

(21) Appl. No.: 15/298,555

(22) Filed: Oct. 20, 2016

(65) Prior Publication Data

US 2017/0116191 A1 Apr. 27, 2017

(30) Foreign Application Priority Data

Oct. 21, 2015 (CN) .......................... 2015 1 0688807

(51) Int. Cl.
*G06F 16/2457* (2019.01)
*G06F 16/93* (2019.01)

(52) U.S. Cl.
CPC ........ *G06F 16/93* (2019.01); *G06F 16/24578* (2019.01)

(58) Field of Classification Search
CPC .............................................. G06F 16/24578
See application file for complete search history.

(56) References Cited

U.S. PATENT DOCUMENTS 7,392,278 B2 6/2008 Chen et al.
7,680,812 B2 3/2010 Canright et al.
(Continued)

FOREIGN PATENT DOCUMENTS

CN 1335574 2/2002
CN 101233513 7/2008
(Continued)

OTHER PUBLICATIONS

Search Report and Office Action for Russian Application No. 2016141279, dated Jan. 19, 2018, 10 pages.
(Continued)

*Primary Examiner* — Kris E Mackes
(74) *Attorney, Agent, or Firm* — Sheppard Mullin Richter & Hampton LLP

(57) ABSTRACT

The present disclosure provides a method and a device of hierarchical document filtering. The method includes: selecting multiple documents from a to-be-filtered document set of a current document filtering layer according to a preset sampling strategy, and forming a first document list by using the selected documents according to an order of the selected documents in the to-be-filtered document set; calculating a quality value of each document in the first document list respectively according to a relevance calculation method for the current document filtering layer; reordering the documents in the first document list according to the quality value of each document in the first document list, to obtain a second document list; and filtering the to-be-filtered document set of the current document filtering layer according to the degree of consistency between the first document list and the second document list.

12 Claims, 2 Drawing Sheets

(56) References Cited

U.S. PATENT DOCUMENTS

| | | | |
|---|---|---|---|
| 2004/0064438 A1* | 4/2004 | Kostoff | G06F 16/35 |
| 2005/0165753 A1 | 7/2005 | Chen | |
| 2006/0036593 A1* | 2/2006 | Dean | G06F 16/24578 |
| 2006/0059144 A1 | 3/2006 | Canright | |
| 2007/0027751 A1 | 2/2007 | Carson | |
| 2007/0033104 A1 | 2/2007 | Collins et al. | |
| 2008/0222141 A1* | 9/2008 | Morales | G06F 16/3331 |
| 2010/0325105 A1 | 12/2010 | Guo | |
| 2014/0351246 A1 | 11/2014 | Guo et al. | |
| 2017/0031912 A1* | 2/2017 | Sankar | G06F 16/24578 |
| 2017/0075893 A1* | 3/2017 | Hummel | G06F 16/24578 |

FOREIGN PATENT DOCUMENTS

| | | |
|---|---|---|
| CN | 101930438 | 12/2010 |
| RU | 2382400 C2 | 2/2010 |
| RU | 2388050 C2 | 4/2010 |

OTHER PUBLICATIONS

First Notice issued by China State Intellectual Property Office, dated Sep. 18, 2016 for Chinese Patent Application No. 201510688807.3 with search report.

Second Notice issued by China State Intellectual Property Office, dated Feb. 3, 2017 for Chinese Patent Application No. 201510688807.3.

\* cited by examiner

METHOD AND DEVICE OF HIERARCHICAL DOCUMENT FILTERING

CROSS REFERENCE TO RELATED APPLICATION

This application is based upon and claims priority to Chinese Patent Application No. 201510688807.3, filed Oct. 21, 2015, the entire contents of which are incorporated herein by reference.

TECHNICAL FIELD

The present disclosure relates to a technical field of information searching, and specifically, to a method and a device of hierarchical document filtering.

BACKGROUND ART

In daily life, a user often uses a keyword to search for desired content by using a search engine. The search engine needs to find related documents among a significant number of documents according to a keyword, so that the user can read the desired content from the related documents.

Currently, during document searching, the search engine first uses a relevance algorithm having a certain number of features to calculate the relevance between each document among the significant number of documents and the keyword, that is, a quality value of the document, and filters out documents with quality values being less than a current filtering threshold. Then, more features are added to the relevance algorithm, quality values of remaining documents are calculated, and documents with quality values being less than a current filtering threshold are further filtered. By analogy, calculation of quality values of documents and filtering out of documents with quality values being less than a filtering threshold are performed multiple times in the foregoing manner until the number of documents resulting from filtering reaches an expected number, and the final remaining documents are determined as related documents found through searching.

During the implementation of the embodiments of the present disclosure, the inventor finds that when there is a number of documents in searching, each time after filtering, there still are many documents remaining. It takes a long time to calculate quality values of a large number of documents each time, and overall, it takes much time, which results in low search efficiency and long search response time.

SUMMARY

In view of this, an objective of the embodiments of the present disclosure is to provide a method and a device of hierarchical document filtering, thereby implementing hierarchical document filtering, shortening the search response time, and improving the search efficiency.

According to a first aspect, an embodiment of the present disclosure provides a method of hierarchical document filtering, wherein the method includes:

selecting multiple documents from a to-be-filtered document set of a current document filtering layer according to a preset sampling strategy, and forming a first document list by using the selected documents according to an order of the selected documents in the to-be-filtered document set, where documents in the to-be-filtered document set are ordered according to quality values of the documents at an upper document filtering layer;

calculating a quality value of each document in the first document list respectively according to a relevance calculation method for the current document filtering layer;

reordering the documents in the first document list according to the quality value of each document in the first document list, to obtain a second document list; and filtering the to-be-filtered document set of the current document filtering layer according to the degree of consistency between the first document list and the second document list.

With reference to the first aspect, this embodiment of the present disclosure provides a first possible implementation of the first aspect, where selecting multiple documents from a to-be-filtered document set of a current document filtering layer according to a preset sampling strategy includes:

determining, according to the number of documents included by the to-be-filtered document set of the current document filtering layer, the number of document subsets into which the to-be-filtered document set needs to be divided, and the number of documents that need to be selected from each of the document subsets;

dividing the to-be-filtered document set into the determined number of document subsets according to a document order; and selecting the determined number of documents from each of the document subsets respectively, to obtain the multiple documents.

With reference to the first possible implementation of the first aspect, this embodiment of the present disclosure provides a third possible implementation of the first aspect, where selecting the determined number of documents from each of the document subsets respectively includes:

selecting the determined number of documents from a front part of each of the document subsets respectively; or, selecting the determined number of documents from each of the document subsets at a predetermined interval respectively; or, selecting the determined number of documents from each of the document subsets respectively in a random manner.

With reference to the first aspect, this embodiment of the present disclosure provides a second possible implementation of the first aspect, where selecting multiple documents from a to-be-filtered document set of a current document filtering layer according to a preset sampling strategy includes:

determining a document sampling interval according to the number of documents included by the to-be-filtered document set of the current document filtering layer; and selecting documents from the to-be-filtered document set at the document sampling interval, to obtain the multiple documents.

With reference to the first aspect, this embodiment of the present disclosure provides a fourth possible implementation of the first aspect, where the filtering the to-be-filtered document set of the current document filtering layer according to the degree of consistency between the first document list and the second document list includes:

judging whether the degree of consistency between the first document list and the second document list is greater than a preset consistency threshold; if yes, filtering out documents meeting a preset filtering condition in the to-be-filtered document set of the current document filtering layer; and if not, calculating a quality value of each document in the to-be-filtered document set according to the relevance calculation method for the current document filtering layer, reordering the documents in the to-be-filtered document set according to the calculated quality values, and filtering out documents meeting the preset filtering condition in the reordered to-be-filtered document set.

With reference to the first aspect, this embodiment of the present disclosure provides a fifth possible implementation of the first aspect, where after filtering the to-be-filtered document set of the current document filtering layer according to the degree of consistency between the first document list and the second document list, the method further includes:

judging whether a preset filtering stop condition is met according to the layer number of the current document filtering layer or the number of documents in the filtered to-be-filtered document set; if yes, determining documents in the filtered to-be-filtered document set as a search result; and if not, using the filtered to-be-filtered document set as a new document set, and filtering the new document set by using a lower document filtering layer.

According to the second aspect, an embodiment of the present disclosure provides a device of hierarchical document filtering, where the device includes:

a selection module, configured to select multiple documents from a to-be-filtered document set of a current document filtering layer according to a preset sampling strategy, and form a first document list by using the selected documents according to an order of the selected documents in the to-be-filtered document set, where documents in the to-be-filtered document set are ordered according to quality values of the documents at an upper document filtering layer;

a calculation module, configured to calculate a quality value of each document in the first document list respectively according to a relevance calculation method for the current document filtering layer;

an ordering module, configured to reorder the documents in the first document list according to the quality value of each document in the first document list, to obtain a second document list; and a filtering module, configured to filter the to-be-filtered document set of the current document filtering layer according to the degree of consistency between the first document list and the second document list.

With reference to the second aspect, this embodiment of the present disclosure provides a first possible implementation of the second aspect, where the selection module includes:

a first determination unit, configured to determine, according to the number of documents included by the to-be-filtered document set of the current document filtering layer, the number of document subsets into which the to-be-filtered document set needs to be divided, and the number of documents that need to be selected from each of the document subsets;

a division unit, configured to divide the to-be-filtered document set into the determined number of document subsets according to a document order; and a first selection unit, configured to select the determined number of documents from each of the document subsets respectively, to obtain the multiple documents.

With reference to the first possible implementation of the determined aspect, this embodiment of the present disclosure provides a third possible implementation of the second aspect, where the first selection unit includes:

a first selection subunit, configured to select the determined number of documents from a front part of each of the document subsets respectively; or, a second selection subunit, configured to select the determined number of documents from each of the document subsets at a predetermined interval respectively; or, a third selection subunit, configured to select the determined number of documents from each of the document subsets respectively in a random manner.

With reference to the second aspect, this embodiment of the present disclosure provides a second possible implementation of the second aspect, where the selection module includes:

a second determination unit, configured to determine a document sampling interval according to the number of documents included by the to-be-filtered document set of the current document filtering layer; and a second selection unit, configured to select documents from the to-be-filtered document set at the document sampling interval, to obtain the multiple documents.

With reference to the second aspect, this embodiment of the present disclosure provides a fourth possible implementation of the second aspect, where the filtering module includes:

a filtering unit, configured to determine whether the degree of consistency between the first document list and the second document list is greater than a preset consistency threshold; if yes, filter out documents meeting a preset filtering condition in the to-be-filtered document set of the current document filtering layer; and if not, calculate a quality value of each document in the to-be-filtered document set according to the relevance calculation method for the current document filtering layer, reorder the documents in the to-be-filtered document set according to the calculated quality values, and filter out documents meeting the preset filtering condition in the reordered to-be-filtered document set.

With reference to the second aspect, this embodiment of the present disclosure provides a fifth possible implementation of the second aspect, where the device further includes:

a stop judgment module, configured to determine whether a preset filtering stop condition is met according to the layer number of the current document filtering layer or the number of documents in the filtered to-be-filtered document set; if yes, determine documents in the filtered to-be-filtered document set as a search result; and if not, use the filtered to-be-filtered document set as a new document set, and filter the new document set by using a lower document filtering layer.

According to the method and device provided by the embodiments of the present disclosure, a first document list is formed by selecting multiple documents from a to-be-filtered document set of a current document filtering layer according to a preset sampling strategy; a quality value of each document in the first document list is calculated respectively according to a relevance calculation method for the current document filtering layer; the documents in the first document list are reordered according to the quality value of each document in the first document list, to obtain a second document list; and the to-be-filtered document set of the current document filtering layer is filtered according to the degree of consistency between the first document list and the second document list. Because the to-be-filtered document set of the current document filtering layer is filtered, the number of documents that need to be processed at a lower document filtering layer is greatly reduced. At each layer, a to-be-filtered document set of the current layer can be filtered according to this solution. Therefore, hierarchical document filtering is implemented, a search response time is shortened, and search efficiency is improved.

In order to make the objectives, features, and advantages of the present disclosure more comprehensible, a detailed description is provided below by using preferred embodiments with reference to the accompanying drawings.

BRIEF DESCRIPTION OF THE DRAWINGS

To illustrate the technical solutions in the embodiments of the present disclosure more clearly, the accompanying drawings required for describing the embodiments are described briefly below. It should be understood that the accompanying drawings below merely show some embodiments of the present disclosure, and therefore should not be construed as limiting the scope. Persons of ordinary skill in the art may still derive other drawings from these accompanying drawings without creative efforts.

DETAILED DESCRIPTION

Figure 1A:
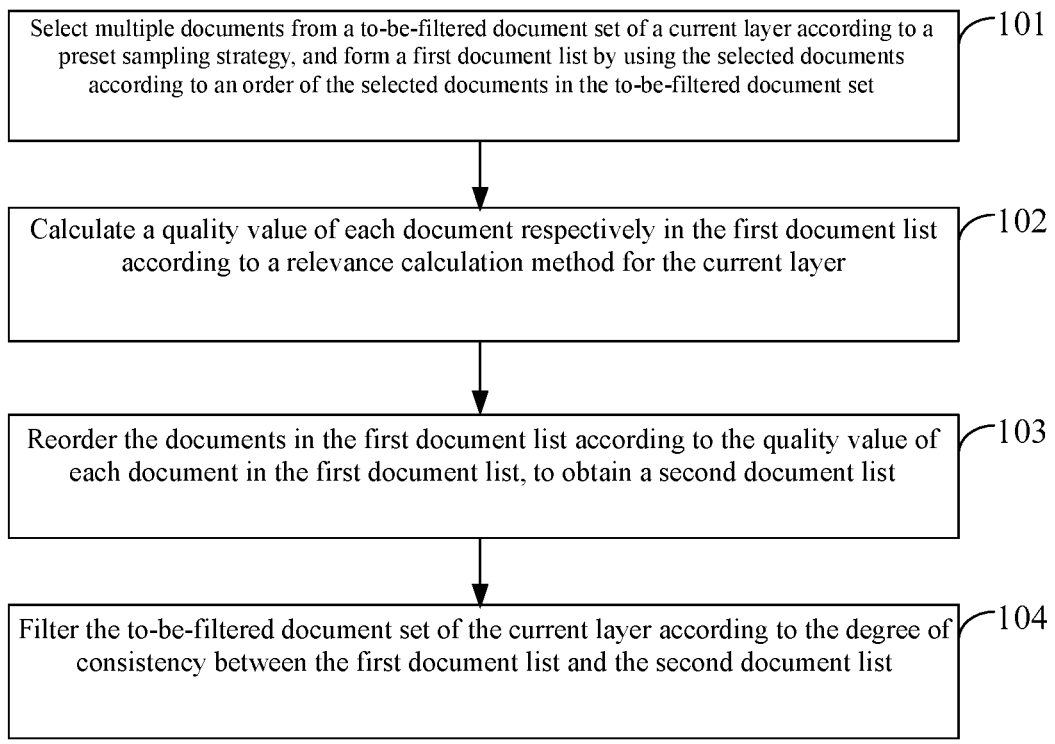
FIG. 1A is a flowchart of a method of hierarchical filtering according to Embodiment 1 of the present disclosure.

The technical solutions according to embodiments of the present disclosure are clearly and completely described below with reference to the accompanying drawings. Apparently, the embodiments below description are merely some rather than all of the embodiments of the present disclosure. Generally, components of the embodiments of the present disclosure described or shown in the accompanying drawings may be arranged and designed according to various configurations. Therefore, the following detailed description of the embodiments of the present disclosure provided in the accompanying drawings is not intended to limit the protection scope of the present disclosure, but merely shows selected embodiments of the present disclosure. All other embodiments derived by persons skilled in the art based on the embodiments of the present disclosure without creative efforts shall fall within the protection scope of the present disclosure.

In the technical field of search to which the present disclosure belongs, the number of documents on the Internet is large, so that a search engine may find a large number of related documents according to a keyword provided by a user, but a considerable part of the large number of related documents are of low relevance to the keyword, and document quality of many documents is poor. If such documents are sent to the user, a probability that the user views such documents is low, and transmission of such documents wastes data traffic on the Internet. To reduce the data traffic and improve the informative nature and document quality of documents that are finally transmitted to the user, the found documents need to be filtered first.

During conception of the document filtering solution of the present disclosure, it is considered that in the art, when the number of documents found through searching is large, filtering may be performed according to document quality values for multiple times. Sometime, the number of remaining documents after each time of filtering may still be large, and it will take a long time to calculate quality values for a large number of documents, resulting in low search efficiency and a long search response time. In an effort to solve these problems, embodiments of the present disclosure provide a method and a device of hierarchical document filtering.

One embodiment of the present disclosure provides a method of hierarchical document filtering. In this embodiment, multiple document filtering layers from top to bottom are preset, a relevance calculation method is preset for each document filtering layer, and the relevance calculation methods of the layers may be different in terms of both the number of features that are used and algorithm complexity. For a lower document filtering layer, an algorithm of higher complexity and more features may be used, so as to improve calculation accuracy.

During document filtering at each document filtering layer, a method of document filtering at the first layer is the same as an existing document filtering method, that is, documents meeting a preset filtering condition are filtered according to a quality value of each document, and remaining documents are transferred to a second layer so as to be further filtered. The preset filtering condition may be that documents with quality values being less than a preset quality threshold are all filtered; or may be that a predetermined number of documents with greatest quality values are kept, and the other documents are filtered. For each of the other filtering layers except the first layer, a to-be-filtered document set of a current document filtering layer is filtered by using the method provided by this embodiment of the present disclosure, and a document set obtained after filtering is performed at the current document filtering layer is used as a document set that needs to be filtered at a lower document filtering layer, until the document set obtained through filtering meets a requirement, for example, the number of document sets reaching an expected number, or until the document set having been filtered by the last layer.

Referring to FIG. 1A, FIG. 1A is a flowchart of a method of hierarchical document filtering provided by this embodiment of the present disclosure, and the method may include the following steps:

Step 101: Select multiple documents from a to-be-filtered document set of a current document filtering layer according to a preset sampling strategy, and form a first document list by using the selected documents according to an order of the selected documents in the to-be-filtered document set.

The to-be-filtered document set of the current document filtering layer is a document set formed by documents that remain after filtering is performed at an upper document filtering layer. Documents in the to-be-filtered document set are ordered according to quality values of the documents at the upper document filtering layer. That is, during filtering at the upper document filtering layer, the quality value of each document in the to-be-filtered document set is calculated according to a relevance calculation method for the upper document filtering layer, and the documents in the to-be-filtered document set are ordered according to a preset order of the quality values. The preset order may be a descending order of the quality values or an ascending order of the quality values.

The relevance calculation method may include that a document quality value is calculated by using a preset algorithm according to a certain number of features, and in this embodiment of the present disclosure, a corresponding relevance calculation method may be configured for each layer. The preset algorithm may be a relevance rating algorithm such as a BM25 algorithm. The quality value may indicate whether document quality is good or poor. A greater quality value indicates a higher document quality, and a smaller quality value indicates a lower document quality.

The features used by the relevance calculation method may be features such as a document length and the number of times or frequency that a keyword appears in the document.

In this embodiment of the present disclosure, the preset sampling strategy may include the number of documents selected from the to-be-filtered document set of the current document filtering layer and a selection method. The selection method may be randomly selecting the documents, selecting the documents from a front part of the to-be-filtered document set, selecting the documents at a predetermined interval, or the like. The number of selected documents is related to the number of documents in the to-be-filtered document set of the current document filtering layer, and the preset sampling strategy may include a preset selection ratio. During document selection, the number of selected documents may be determined according to the number of documents included by the to-be-filtered document set and the selection ratio.

In this embodiment of the present disclosure, the multiple documents may be selected from the to-be-filtered document set of the current document filtering layer directly according to the preset sampling strategy, and the first document list is formed by using the selected documents according to the order of the selected documents in the to-be-filtered document set. An ordering manner of the documents in the first document list obtained in this way is the same as an ordering manner of the documents in the to-be-filtered document set, and the documents in the first document list are all ordered according to the quality values of the documents at the upper document filtering layer, so that reliability of an order of the documents in the first document list is close to the reliability of an order of the documents in the to-be-filtered document set, and the first document list may be used to represent the to-be-filtered document set. The number of documents in the first document list is far less than the number of documents in the to-be-filtered document set, so that performing subsequent processing by using the first document list to represent the to-be-filtered document set can greatly reduce the amount of calculation, simplify a processing process, and improve filtering efficiency.

For ease of understanding the foregoing operation of selecting the documents and forming the first document list, a description is provided by way of an example below. For example, it is assumed that the preset selection ratio included in the preset sampling strategy is 20%, the selection method is that selection is performed at a predetermined interval of 10, and the number of documents in the to-be-filtered document set of the current document filtering layer is 5000. One document is selected, at an interval of every 10 documents, from the 5000 documents included by the to-be-filtered document set of the current document filtering layer, totally 500 documents are selected, and the first document list is formed by using the 500 documents according to the order of the 500 documents in the to-be-filtered document set.

When the documents are selected from the to-be-filtered document set through sampling, if selection is more even, the extent to which the obtained first document list represents the to-be-filtered document set is greater. Therefore, in order to select the documents evenly from the to-be-filtered document set, before the foregoing document selection operation, the to-be-filtered document set may be further divided evenly into multiple document subsets, and then documents are selected from each document subset respectively. The number of document subsets obtained through division is related to the number of documents in the to-be-filtered document set of the current document filtering layer, and the preset sampling strategy may further include a preset division rule, the number of documents selected from the document subset, and a selection method. The preset division rule may be that the number of documents in the document subset obtained through division is a fixed value; or, the preset division rule may be that when the number of documents in the to-be-filtered document set is greater than a preset threshold, the to-be-filtered document set is divided into a first preset number of document subsets, or otherwise, the to-be-filtered document set is divided into a second preset number of document subsets. In some other embodiments, other division rules may be used to divide and select the documents. The division rules may be set according to actual needs in practice.

Figure 1B:
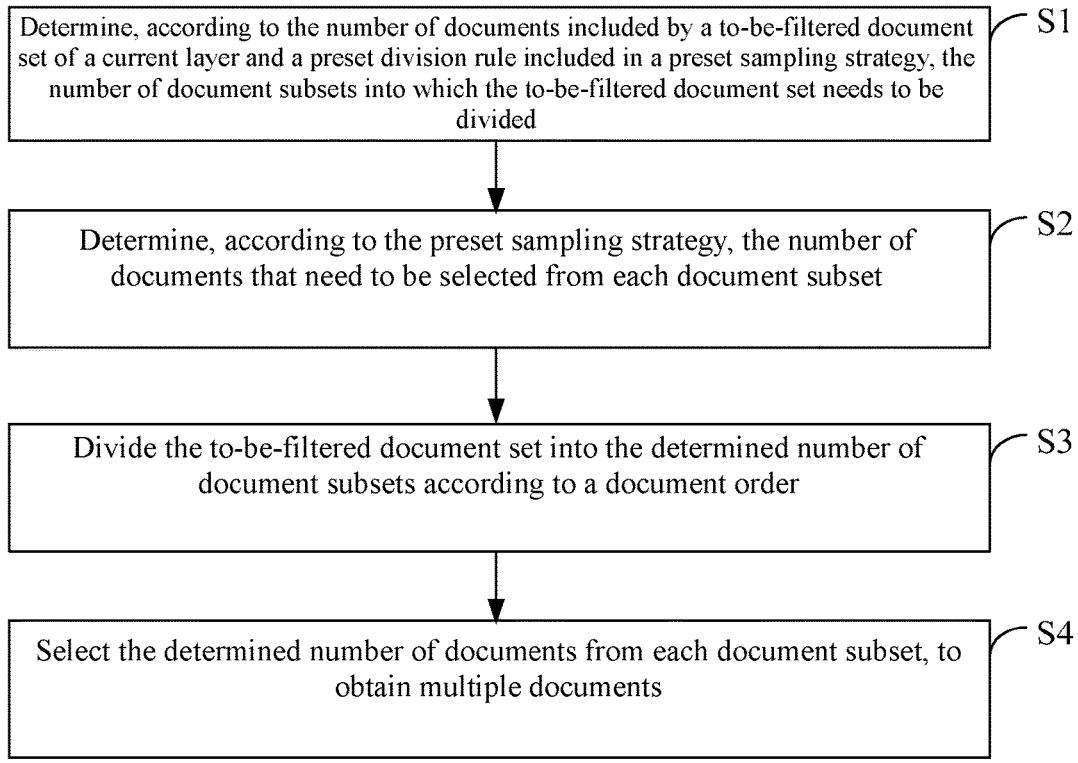
FIG. 1B is a schematic flowchart of document selection according to Embodiment 1 of the present disclosure.

As shown in FIG. 1B, the foregoing operation of obtaining the document subsets through division first and then selecting the documents may be specifically implemented through operation of the following steps S1 to S4, which specifically includes:

S1: Determine, according to the number of documents included by the to-be-filtered document set of the current document filtering layer and a preset division rule included in the preset sampling strategy, the number of document subsets (first number) into which the to-be-filtered document set needs to be divided.

S2: Determine, according to the preset sampling strategy, the number of documents (second number) that need to be selected from each document subset.

S3: Divide the to-be-filtered document set into the first number of document subsets according to a document order.

S4: Select the second number of documents from each document subset respectively, to obtain the multiple documents.

The operation of selecting the second number of documents from each document subset respectively may be performed by using multiple selection methods, which specifically includes:

selecting the second number of documents from a front part of each document subset respectively; or, selecting the second number of documents from each document subset at a predetermined interval respectively; or, selecting the second number of documents from each document subset respectively in a random manner.

Directly selecting the documents from the front parts of the document subsets enables the second number of documents to be quickly selected from each document subset, thereby shortening a time of selecting the documents from the to-be-filtered document set. Performing selection at the predetermined interval or performing random selection enables documents to be evenly selected from each document subset, so that the finally formed first document list can better represent the to-be-filtered document set.

For ease of understanding the foregoing method of obtaining the document subsets first through division and then selecting the documents, a description is provided in the below by way of an example. For example, it is assumed that the preset division rule included in the preset sampling strategy is that the number of documents in the document subset obtained through division is 200, the number of documents selected from the document subset is 20, and the selection method is random selection; and the number of documents in the to-be-filtered document set of the current document filtering layer is 5000. The number of document subsets that need to be obtained through division is determined to be 25 according to the rule that the number of documents in the to-be-filtered document set of the current document filtering layer is 5000 and that the number of documents in the document subset is preset to 200 in the preset division rule. Respectively, 20 documents are randomly selected from each of the 25 document subsets obtained through division, and therefore, totally 500 documents are selected. The first document list is formed by using the 500 document according to the order of the 500 documents in the to-be-filtered document set.

In this embodiment of the present disclosure, when the documents are selected from the to-be-filtered document set of the current document filtering layer by using a spaced-sampling method, if the documents are selected at the predetermined interval, when the number of documents in the to-be-filtered document set of the current document filtering layer is very large, a large number of documents are selected from the to-be-filtered document set, and as a result, an amount of calculation is still very large when subsequent filtering processing is performed according to the formed first document list. Therefore, during spaced sampling, a sampling interval may be adapted to the number of documents included by the to-be-filtered document set of the current document filtering layer. A larger number of documents results in a larger sampling interval, and a smaller number of documents results in a smaller sampling interval. Specific selection operation of the spaced sampling includes:

Multiple sampling intervals may be set in the preset sampling strategy, and each sampling interval corresponds to a document quantity range respectively. The document quantity range corresponding to the number of documents included by the to-be-filtered document set is determined according to the preset sampling strategy and the number of documents included by the to-be-filtered document set of the current document filtering layer, the sampling interval corresponding to the number range is determined as the document sampling interval, and then documents are selected from the to-be-filtered document set according to the document sampling interval, so as to obtain the multiple documents.

For example, it is assumed that in the preset sampling strategy, it is set that a sampling interval of 10 is corresponding to a document quantity range of [2000, 5000], and it is set that a sampling interval of 20 is corresponding to a document quantity range of (5000, 10000], and it is assumed that the number of documents included by the to-be-filtered document set of the current document filtering layer is 8000, so that it is determined that a range corresponding to a document quantity of 8000 is (5000, 10000], and it is determined that the sampling interval of the to-be-filtered document set of the current document filtering layer is 20. One document is selected, at each interval of 20 documents, from the 8000 documents included by the to-be-filtered document set, and totally 400 documents are selected.

Through operation of step 101, the first document list is formed by using the documents selected from the to-be-filtered document set. An arrangement order of the documents in the first document list is the same as an arrangement order of the documents in the to-be-filtered document set.

Step 102: Calculate a quality value of each document in the first document list respectively according to a relevance calculation method for the current document filtering layer.

For each document included in the first document list, a parameter value of a preset feature used by the current document filtering layer is obtained from the document, and the quality value of the document is calculated according to the obtained parameter value of the feature by using a preset relevance rating algorithm. For example, it is assumed that the preset feature used by the current document filtering layer is a document length and the number of times a keyword appears, and it is assumed that the preset relevance rating algorithm is a BM25 algorithm, so, using these settings, the length of the document is obtained, the number of times the keyword appears in the document is counted, and the quality value of the document is calculated by using the BM25 algorithm according to the length of the document and the number of times the keyword appears.

Step 103: Reorder the documents in the first document list according to the quality value of each document in the first document list, to obtain a second document list.

The documents in the first document list are reordered according to the calculated quality value of each document in the first document list and a preset order, to obtain the second document list.

The preset order is the same as the ordering manner of the documents in the to-be-filtered document set. That is, if the documents in the to-be-filtered document set are ordered in descending order of quality values, the preset order is also ordering in descending order of quality values; and if the documents in the to-be-filtered document set are ordered in ascending order of quality values, the preset order is also ordering in ascending order of quality values.

In this way, the ordering manner of the documents in the second document list obtained through reordering is the same as the ordering manner of the documents in the first document list. A difference lies in that the documents in the first document list are ordered according to the quality values at the upper document filtering layer, but the documents in the second document list are ordered according to the quality values at the current document filtering layer. Therefore, if the arrangement order of the documents in the first document list is very close to or the same as the arrangement order of the documents in the second document list, it is indicated that an ordering result of the document ordering performed according to the quality values calculated according to the relevance calculation method for the current document filtering layer is very close to an ordering result of document ordering performed according to quality values calculated according to the relevance calculation method for an upper document filtering layer, and in this case, calculation processing does not need to be performed on each document in the to-be-filtered document set at the current document filtering layer.

Therefore, after the second document list is obtained, operation of the following step 104 further needs to be performed to determine the degree of consistency between the first document list and the second document list, and filter the to-be-filtered document set according to the degree of consistency between the two.

Step 104: Filter the to-be-filtered document set of the current document filtering layer according to the degree of consistency between the first document list and the second document list.

The degree of consistency between the first document list and the second document list is calculated according to an orderly-list order consistency index by using a preset consistency algorithm. The consistency index may be a webpage evaluation index, such as a DCG (Discounted Cumulative Gain, an index that measures the quality of a search engine) or an nDCG (normalize Discounted Cumulative Gain, a standard index that measures the quality of a search engine). The preset consistency algorithm may be a DCG algorithm or an nDCG algorithm.

The calculated degree of consistency is within a value range of [0, 1]. If the degree of consistency approaches 1, it is indicated that a difference between the arrangement order of the documents in the first document list and the arrangement order of the documents in the second document list is not large, and therefore it is indicated that a difference between the ordering performed on the to-be-filtered document set according to the quality values at the upper document filtering layer and the ordering performed on the to-be-filtered document set according to the quality values at the current document filtering layer is not large. If the degree of consistency approaches 0, it is indicated that a difference between the arrangement order of the documents in the first document list and the arrangement order of the documents in the second document list is very large, and therefore it is indicated that a difference between the ordering performed on the to-be-filtered document set according to the quality values at the upper document filtering layer and the ordering performed on the to-be-filtered document set according to the quality values at the current document filtering layer is very large.

In this embodiment of the present disclosure, the preset consistency threshold is preset, and the preset consistency threshold may be a value close to 1, such as 0.85 or 0.9. It is determined whether the degree of consistency is greater than the preset consistency threshold. When it is determined that the degree of consistency is greater than the preset consistency threshold, it is determined that the arrangement order of the documents in the first document list is the same as the arrangement order of the documents in the second document list. Otherwise, when the degree of consistency is less than or equal to the preset consistency threshold, it is determined that the arrangement order of the documents in the first document list is different from the arrangement order of the documents in the second document.

When it is determined that the arrangement order of the documents in the first document list is consistent with the arrangement order of the documents in the second document list, the arrangement order of the documents in the to-be-filtered document set is determined to be credible, calculating the quality value of each document according to the relevance calculation method for the current document filtering layer and performing reordering are not needed, and instead documents meeting the preset filtering condition in the to-be-filtered document set of the current document filtering layer are directly filtered. The preset filtering condition may be that documents with quality values being less than a preset quality threshold are filtered; or, the preset filtering condition may be that a preset number of documents with greatest quality values are kept, and the other documents are filtered.

When it is determined that the arrangement order of the documents in the first document list is not consistent with the arrangement order of the documents in the second document list, the arrangement order of the documents in the to-be-filtered document set is determined to be not credible, the quality value of each document in the to-be-filtered document set is calculated according to the relevance calculation method for the current document filtering layer, the documents in the to-be-filtered document set are reordered according to the calculated quality values, and documents meeting the preset filtering condition in the ordered to-be-filtered document set are filtered.

In this embodiment of the present disclosure, the credibility of the arrangement order of the documents in the to-be-filtered document set is determined according to the degree of consistency between the first document list and the second document list; when it is determined that the arrangement order of the documents in the to-be-filtered document set is credible, the to-be-filtered document set is filtered directly; and only when it is determined that the arrangement order of the documents in the to-be-filtered document set is not credible, the quality value of each document in the to-be-filtered document set needs to be calculated. In this way, when the arrangement order of the documents in the to-be-filtered document set is credible, the number of documents that need to be calculated at the current document filtering layer can be greatly reduced.

In a document searching process, a to-be-filtered document set may be filtered at each filtering layer according to the operation of the foregoing steps 101 to 104, so that when an arrangement order of documents in the to-be-filtered document set is credible at multiple layers, the number of documents that need to be calculated in the entire searching process can be greatly reduced, search efficiency is improved, and a search response time is reduced.

In this embodiment of the present disclosure, a filtering stop condition may be further preset. The preset filtering stop condition may be: filtering is stopped when the number of documents in the filtered to-be-filtered document set is less than a certain value, that is, in this case, the number of remaining documents after the filtering already reaches an expected value, and filtering may be stopped.

Alternatively, the preset filtering stop condition may be: when a current document filtering layer is the last layer, document filtering operation is stopped, that is, after a document set is filtered at the last document filtering layer, document filtering is stopped. In addition, a layer at which filtering stops may also be set by a user according to specific needs. For example, in an application scenario, 10 document filtering layers are set, but during a search performed by a user, document filtering does not need to be performed at many layers. For example, only 5 layers of document filtering may be needed, and it may be set that when the fifth layer of document filtering is performed, filtering is stopped. In this case, when it is determined that the layer number of the current layer is 5, filtering is stopped after documents of the current layer are filtered.

At each document filtering layer, when it is determined, according to the layer number of the current document filtering layer or according to the number of documents in a filtered to-be-filtered document set, a preset stop condition is met, the documents in the filtered to-be-filtered document set are determined as a search result. When it is determined that the preset stop condition is not met, the filtered to-be-filtered document set is used as a new document set, and the new document set is filtered at a lower document filtering layer by using the method provided by this embodiment of the present disclosure, until the preset stop condition is met.

To better understand the effect of the method of hierarchical document filtering provided by this embodiment of the present disclosure on search efficiency improvement, a description is provided below by way of an example.

For example, it is assumed that there are totally three document filtering layers. The first document filtering layer needs to calculate 100 thousand documents, select best 5000 documents therefrom, and provide the best 5000 documents to the second document filtering layer. The second document filtering layer selects best 200 documents from the 5000 documents, and provides the best 200 documents to the third document filtering layer. It is assumed that an operation cost of calculating one document by the first document filtering layer is 1, an operation cost of calculating one document by the second document filtering layer is 10, and an operation cost of calculating one document by the third document filtering layer is 50.

If calculation is performed directly layer by layer by using an existing document filtering method, a total cost is 100000*1+5000*10+200*50=160000. However, if the method of hierarchical document filtering provided by this embodiment of the present disclosure is followed, the second document filtering layer divides the 5000 documents into document subsets according a size of 200, totally 25 document subsets are obtained through division, 20 documents are selected from each document subset, and totally 500 documents are selected for relevance calculation. It is assumed that, in an optimal situation, that is, an ordering result of the first document filtering layer is substantially the same as an ordering result of the second document filtering layer, the second document filtering layer may directly transfer the first 200 of the 5000 documents to the third document filtering layer. In this way, a total cost of calculation is: 100000*1+500*10+200*50=115000. Compared with an existing document filtering method, the method of hierarchical document filtering provided by this embodiment of the present disclosure improves performance by approximately (16−11.5)/16=28%. It can be seen that, the method provided by this embodiment of the present disclosure is very impressive in contribution to shortening a search time and improving search efficiency.

In this embodiment of the present disclosure, a first document list is formed by selecting multiple documents from a to-be-filtered document set of a current document filtering layer according to a preset sampling strategy; a quality value of each document in the first document list is calculated respectively according to a relevance calculation method for the current document filtering layer; the documents in the first document list are reordered according to the quality value of each document in the first document list, to obtain a second document list; and the to-be-filtered document set of the current document filtering layer is filtered according to the degree of consistency between the first document list and the second document list. Because the to-be-filtered document set of the current document filtering layer is filtered, the number of documents that need to be processed at a lower document filtering layer are greatly reduced. At each layer, a to-be-filtered document set of the current layer can be filtered according to this solution. Therefore, hierarchical document filtering is implemented, a search response time is shortened, and search efficiency is improved.

Figure 2:
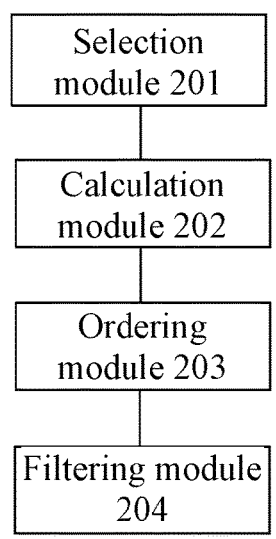
FIG. 2 is a schematic structural diagram of a device of hierarchical filtering according to Embodiment 2 of the present disclosure.

Referring to FIG. 2, the present disclosure provides a device of hierarchical filtering. The device is configured to execute the foregoing method of hierarchical filtering. In some embodiments, the device includes: a selection module 201, a calculation module 202, an ordering module 203, and a filtering module 204.

The selection module 201 is configured to select multiple documents from a to-be-filtered document set of a current document filtering layer according to a preset sampling strategy, and form a first document list by using the selected documents according to an order of the selected documents in the to-be-filtered document set, where documents in the to-be-filtered document set are ordered according to quality values of the documents at an upper document filtering layer.

The to-be-filtered document set of the current document filtering layer is a document set formed by documents that remain after filtering is performed at an upper document filtering layer. Documents in the to-be-filtered document set are ordered according to quality values of the documents at the upper document filtering layer. That is, during filtering at the upper document filtering layer, the quality value of each document in the to-be-filtered document set is calculated according to a relevance calculation method for the upper document filtering layer, and the documents in the to-be-filtered document set are ordered according to a preset order of the quality values. The preset order may be a descending order of the quality values or an ascending order of the quality values.

The relevance calculation method may include that a document quality value is calculated by using a preset algorithm according to a certain number of features, and in this embodiment of the present disclosure, a corresponding relevance calculation method may be configured for each layer. The preset algorithm may be a relevance rating algorithm such as a BM25 algorithm. The quality value may indicate whether document quality is good or poor. A greater quality value indicates higher document quality, and a smaller quality value indicates lower document quality. The features used by the relevance calculation method may be features such as a document length and the number of times or frequency that a keyword appears in the document. In this embodiment of the present disclosure, the number of features used by the relevance calculation method of each layer may be different, the number of features used by a higher filtering layer is larger, and features used by each layer may be preset.

The preset sampling strategy may include the number of documents selected from the to-be-filtered document set of the current document filtering layer and a selection method. The selection method may be randomly selecting the documents, selecting the documents from a front part of the to-be-filtered document set, selecting the documents at a predetermined interval, or the like. The number of selected documents is related to the number of documents in the to-be-filtered document set of the current document filtering layer, and the preset sampling strategy may include a preset selection ratio.

The selection module 201 may select the multiple documents from the to-be-filtered documents by using a first determination unit, a division unit, and a first selection unit below, which specifically includes:

The first determination unit determines, according to the preset sampling strategy and the number of documents included by the to-be-filtered document set of the current document filtering layer, the number of document subsets (the first number) into which the to-be-filtered document set needs to be divided and the number of documents (the second number) that need to be selected from each document subset; the division unit divides the to-be-filtered document set into the first number of document subsets according to a document order; and the first selection unit selects the second number of documents from each document subset respectively, to obtain the multiple documents.

The first selection unit may select the documents from each document subset respectively by choosing to use a first selection subunit, a second selection subunit, or a third selection subunit.

The first selection subunit selects the second number of documents from a front part of each document subset respectively; the second selection subunit selects the second number of documents from each document subset at a predetermined interval respectively; and the third selection subunit selects the second number of documents from each document subset respectively in a random manner.

Directly selecting the documents from the front parts of the document subsets enables the second number of documents to be quickly selected from each document subset, thereby shortening a time of selecting the documents from the to-be-filtered document set. Performing selection at the predetermined interval or performing random selection enables documents to be evenly selected from each document subset, so that the finally formed first document list can better represent the to-be-filtered document set.

In some embodiments, when the documents are selected from the to-be-filtered document set of the current document filtering layer by using a spaced-sampling method, if the documents are selected at the predetermined interval, when the number of documents in the to-be-filtered document set of the current document filtering layer is very large, a large number of documents are selected from the to-be-filtered document set, and as a result, an amount of calculation is still very large when subsequent filtering processing is performed according to the formed first document list. Therefore, during spaced sampling, a sampling interval may be adapted to the number of documents included by the to-be-filtered document set of the current document filtering layer. A larger number of documents results in a larger sampling interval, and a smaller number of documents results in a smaller sampling interval.

Correspondingly, in addition to selecting the multiple documents from the to-be-filtered documents by using the first determination unit, the division unit, and the first selection unit in the foregoing, the selection module 201 may further select the multiple documents by using a second determination unit and a second selection unit described below.

The second determination unit determines the document sampling interval according to the preset sampling strategy and the number of documents included by the to-be-filtered document set of the current document filtering layer; and the second selection unit selects documents from the to-be-filtered document set at the document sampling interval, to obtain the multiple documents.

The calculation module 202 is configured to calculate a quality value of each document in the first document list respectively according to a relevance calculation method for the current document filtering layer.

The ordering module 203 is configured to reorder the documents in the first document list according to the quality value of each document in the first document list, to obtain a second document list.

The ordering manner of the documents in the second document list obtained through reordering is the same as the ordering manner of the documents in the first document list. A difference lies in that the documents in the first document list are ordered according to the quality values at the upper document filtering layer, but the documents in the second document list are ordered according to the quality values at the current document filtering layer. Therefore, if the arrangement order of the documents in the first document list is very close to or the same as the arrangement order of the documents in the second document list, it is indicated that an ordering result of the document ordering performed according to the quality values calculated according to the relevance calculation method for the current document filtering layer is very close to an ordering result of document ordering performed according to quality values calculated according to the relevance calculation method for an upper document filtering layer, and in this case, calculation processing does not need to be performed on each document in the to-be-filtered document set at the current document filtering layer.

The filtering module 204 is configured to filter the to-be-filtered document set of the current document filtering layer according to the degree of consistency between the first document list and the second document list. The filtering module 204 filters the to-be-filtered document set of the current document filtering layer by using a calculation unit and a filtering unit. The calculation unit calculates the degree of consistency between the first document list and the second document list. The filtering unit determines whether the degree of consistency is greater than a preset consistency threshold; if yes, filters out documents meeting a preset filtering condition in the to-be-filtered document set of the current document filtering layer; and if not, calculates a quality value of each document in the to-be-filtered document set according to the relevance calculation method for the current document filtering layer, reorders the documents in the to-be-filtered document set according to the calculated quality values, and filters out documents meeting the preset filtering condition in the reordered to-be-filtered document set.

In this embodiment of the present disclosure, the credibility of the arrangement order of the documents in the to-be-filtered document set is determined according to the degree of consistency between the first document list and the second document list; when it is determined that the arrangement order of the documents in the to-be-filtered document set is credible, the to-be-filtered document set is filtered directly; and only when it is determined that the arrangement order of the documents in the to-be-filtered document set is not credible, the quality value of each document in the to-be-filtered document set needs to be calculated. In this way, when the arrangement order of the documents in the to-be-filtered document set is credible, the number of documents that need to be calculated at the current document filtering layer can be greatly reduced.

In a document searching process, a to-be-filtered document set may be filtered at each filtering layer according to operation of the selection module 201, the calculation module 202, the ordering module 203, and the filtering module 204, so that when an arrangement order of documents in the to-be-filtered document set is credible at multiple layers, the number of documents that need to be calculated in the entire searching process can be greatly reduced, search efficiency is improved, and a search response time is reduced.

In addition, in the embodiments of the present disclosure, a filtering stop condition may be further preset, and the preset stop condition may be: when the layer number of a current document filtering layer reaches a preset layer number, searching is stopped. Alternatively, the preset stop condition may be: when the number of documents in the filtered to-be-filtered document set is less than a certain value, searching is stopped. The device of hierarchical filtering provided by this embodiment of the present disclosure determines, by using a stop judgment module below, whether to stop searching.

The stop judgment module determines whether a preset filtering stop condition is met according to the layer number of the current document filtering layer or the number of documents in the filtered to-be-filtered document set; if yes, determines documents in the filtered to-be-filtered document set as a search result; and if not, uses the filtered to-be-filtered document set as a new document set, and filters the new document set by using a lower document filtering layer.

In this embodiment of the present disclosure, a first document list is formed by selecting multiple documents from a to-be-filtered document set of a current document filtering layer according to a preset sampling strategy; a quality value of each document in the first document list is calculated respectively according to a relevance calculation method for the current document filtering layer; the documents in the first document list are reordered according to the quality value of each document in the first document list, to obtain a second document list; and the to-be-filtered document set of the current document filtering layer is filtered according to the degree of consistency between the first document list and the second document list. Because the to-be-filtered document set of the current document filtering layer is filtered, the number of documents that need to be processed at a lower document filtering layer is greatly reduced. At each layer, a to-be-filtered document set of the current layer can be filtered according to this solution. Therefore, hierarchical document filtering is implemented, a search response time is shortened, and search efficiency is improved.

The device of hierarchical filtering provided by this embodiment of the present disclosure may be specific hardware on an apparatus, software or firmware installed on an apparatus, or the like. It can be clearly understood by persons skilled in the art that, for the purpose of convenient and brief description, for a detailed working process of the foregoing device, module, and unit, reference may be made to the corresponding process in the foregoing method embodiments.

In the embodiments provided in the present application, it should be understood that the disclosed device and method may be implemented in other manners. The described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between devices or units may be implemented in electronic, mechanical or other forms The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer apparatus (which may be a personal computer, a server, or a network apparatus) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

The invention claimed is:

1. A method for filtering documents, comprising:
   selecting multiple documents from a to-be-filtered document set of a current document filtering layer according to a preset sampling strategy, and forming a first document list by using the selected documents according to an order of the selected documents in the to-be-filtered document set, wherein documents in the to-be-filtered document set are ordered according to upper layer quality values of the documents at an upper document filtering layer;
   calculating a current layer quality value of each document in the first document list on the current document filtering layer according to a relevance calculation method for the current document filtering layer;
   reordering the documents in the first document list according to the current layer quality value of each document in the first document list on the current document filtering layer, to obtain a second document list; and
   filtering the to-be-filtered document set of the current document filtering layer according to a degree of consistency between the first document list and the second document list.

2. The method according to claim 1, wherein the selecting multiple documents from a to-be-filtered document set of a current document filtering layer according to a preset sampling strategy comprises:
   determining, according to the number of documents in the to-be-filtered document set of the current document filtering layer, a number of document subsets into which the to-be-filtered document set needs to be divided, and a number of documents that need to be selected from each of the document subsets;
   dividing the to-be-filtered document set into the determined number of document subsets according to a document order; and
   selecting the determined number of documents from each of the document subsets, to obtain the multiple documents.

3. The method according to claim 2, wherein the selecting the determined number of documents from each of the document subsets comprises:
   selecting the determined number of documents from a front part of each of the document subsets; or,
   selecting the determined number of documents from each of the document subsets at a predetermined interval; or,
   selecting the determined number of documents from each of the document subsets in a random manner.

4. The method according to claim 1, wherein the selecting multiple documents from a to-be-filtered document set of a current document filtering layer according to a preset sampling strategy comprises:
   determining a document sampling interval according to the number of documents in the to-be-filtered document set of the current document filtering layer; and
   selecting documents from the to-be-filtered document set at the document sampling interval, to obtain the multiple documents.

5. The method according to claim 1, wherein filtering the to-be-filtered document set of the current document filtering layer according to the degree of consistency between the first document list and the second document list comprises:
- determining whether the degree of consistency between the first document list and the second document list is greater than a preset consistency threshold;
- if the degree of consistency is greater than the preset consistency threshold, filtering out documents meeting a preset filtering condition in the to-be-filtered document set of the current document filtering layer; and
- if the degree of consistency is not greater than the preset consistency threshold, calculating the current layer quality value of each document in the to-be-filtered document set according to the relevance calculation method for the current document filtering layer, reordering the documents in the to-be-filtered document set according to the calculated current layer quality values, and filtering out documents meeting the preset filtering condition in the reordered to-be-filtered document set.

6. The method according to claim 1, further comprising, after the filtering the to-be-filtered document set of the current document filtering layer according to the degree of consistency between the first document list and the second document list,
- determining whether a preset filtering stop condition is met according to the layer number of the current document filtering layer or the number of documents in the filtered to-be-filtered document set;
- if the preset filtering stop condition is met, determining documents in the filtered to-be-filtered document set as a search result; and
- if the preset filtering stop condition is not met, using the filtered to-be-filtered document set as a new document set, and filtering the new document set by using a lower document filtering layer.

7. A device for filtering documents comprising one or more processors and one or more non-transitory computer-readable memories coupled to the one or more processors and configured with instructions executable by the one or more processors to cause the system to perform operations comprising:
- selecting multiple documents from a to-be-filtered document set of a current document filtering layer according to a preset sampling strategy; and
- forming a first document list by using the selected documents according to an order of the selected documents in the to-be-filtered document set, wherein documents in the to-be-filtered document set are ordered according to upper layer quality values of the documents at an upper document filtering layer;
- calculating a current layer quality value of each document in the first document list respectively according to a relevance calculation method for the current document filtering layer;
- reordering the documents in the first document list according to the current layer quality value of each document in the first document list, to obtain a second document list; and
- filtering the to-be-filtered document set of the current document filtering layer according to a degree of consistency between the first document list and the second document list.

8. The device according to claim 7, wherein the selecting multiple documents from a to-be-filtered document set of a current document filtering layer according to a preset sampling strategy comprises:
- determining, according to a number of documents in the to-be-filtered document set of the current document filtering layer, a number of document subsets into which the to-be-filtered document set needs to be divided, and a number of documents that need to be selected from each of the document subsets;
- dividing the to-be-filtered document set into the determined number of document subsets according to a document order; and
- selecting the determined number of documents from each of the document subsets respectively, to obtain the multiple documents.

9. The device according to claim 8, wherein the selecting the determined number of documents from each of the document subsets comprises:
- selecting the determined number of documents from a front part of each of the document subsets respectively; or,
- selecting the determined number of documents from each of the document subsets at a predetermined interval respectively; or,
- selecting the determined number of documents from each of the document subsets respectively in a random manner.

10. The device according to claim 7, wherein the selecting multiple documents from a to-be-filtered document set of a current document filtering layer according to a preset sampling strategy comprises:
- determining a document sampling interval according to the number of documents in the to-be-filtered document set of the current document filtering layer; and
- selecting documents from the to-be-filtered document set at the document sampling interval, to obtain the multiple documents.

11. The device according to claim 7, wherein the filtering the to-be-filtered document set of the current document filtering layer according to the degree of consistency between the first document list and the second document list comprises:
- determining whether the degree of consistency between the first document list and the second document list is greater than a preset consistency threshold;
- if the degree of consistency between the first document list and the second document list is greater than the preset consistency threshold, filtering out documents meeting a preset filtering condition in the to-be-filtered document set of the current document filtering layer; and
- if the degree of consistency between the first document list and the second document list is not greater than the preset consistency threshold, calculating the current layer quality value of each document in the to-be-filtered document set according to the relevance calculation method for the current document filtering layer, reordering the documents in the to-be-filtered document set according to the calculated current layer quality values, and filtering out documents meeting the preset filtering condition in the reordered to-be-filtered document set.

12. The device according to claim 7, wherein the operations further comprise:
- determining whether a preset filtering stop condition is met according to the layer number of the current document filtering layer or the number of documents in the filtered to-be-filtered document set;
- if the preset filtering stop condition is met, determining documents in the filtered to-be-filtered document set as a search result; and if the preset filtering stop condition is not met, using the filtered to-be-filtered document set as a new document set, and filtering the new document set by using a lower document filtering layer.

* * * * *